Dec. 24, 1940.     E. FREYSSINET     2,226,201
JACK APPARATUS
Filed July 5, 1939     5 Sheets-Sheet 1

Eugene Freyssinet
By
Watson, Cole, Grindle & Watson
ATTYS.

Dec. 24, 1940.   E. FREYSSINET   2,226,201
JACK APPARATUS
Filed July 5, 1939   5 Sheets-Sheet 2

Eugene Freyssinet
By
Watson, Cole, Grindle & Watson
ATTYS.

Dec. 24, 1940.  E. FREYSSINET  2,226,201
JACK APPARATUS
Filed July 5, 1939  5 Sheets-Sheet 3

Eugene Freyssinet
By
Watson, Cole, Grindle & Watson
ATTYS.

Dec. 24, 1940.　　　　　E. FREYSSINET　　　　　2,226,201
JACK APPARATUS
Filed July 5, 1939　　　　　5 Sheets-Sheet 4

Eugene Freyssinet
By
Watson, Cole, Grindle & Watson
Attys.

Patented Dec. 24, 1940

2,226,201

UNITED STATES PATENT OFFICE 2,226,201

JACK APPARATUS

Eugène Freyssinet, Neuilly-sur-Seine, France

Application July 5, 1939, Serial No. 282,957
In France August 1, 1938

20 Claims. (Cl. 61—50)

The present invention concerns apparatus intended to act as jacks.

The chief object of the present invention is to provide an apparatus of this kind which, under an extremely small volume, permits of exerting very high efforts, such as those which are necessary, in particular, for civil engineering, such an apparatus being simple to manufacture and of low cost.

The apparatus according to the invention essentially includes a kind of bag of a malleable metal, which may include two plates, forming the bearing faces of the apparatus and connected together, along their edges, by welded joints, or other fluid-tight joints, preferably through the intermediate of a cylindrical or tore-shaped element which enables the plates to move with respect to each other without being deformed when the pressure of the fluid fed into the bag is modified. A conduit fixed on the cylindrical or tore-shaped element or to any other suitable part of the apparatus permits of injecting liquid into the bag.

Several methods of applications of such apparatus will be hereinafter set forth.

According to an important feature of the present invention, when the apparatus is to be left in a permanent manner in a piece of work so as to create permanent efforts therein, the apparatus is inflated with a matter which is injected in the liquid state and which solidifies subsequently without substantial variation of volume and remains in the solid state under normal conditions of use, such a matter consisting, for instance, of cement, a fusible matter or a suitable synthetic resin.

Various applications of the apparatus, according to the invention, will be hereinafter explained.

Other features of the present invention will result from the following detailed description of some specific embodiments thereof.

Preferred embodiments of the present invention will be hereinafter described, with reference to the accompanying drawings, given merely by way of example, and in which.

Figure 1:
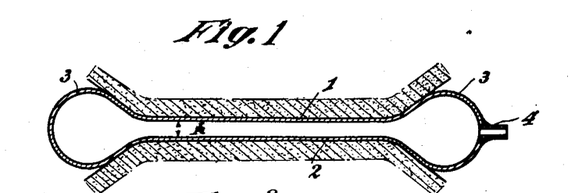
Fig. 1 is a diagrammatic sectional view of an apparatus made according to the present invention before the pressure is applied.
Figures 2, 5, 11, 12:
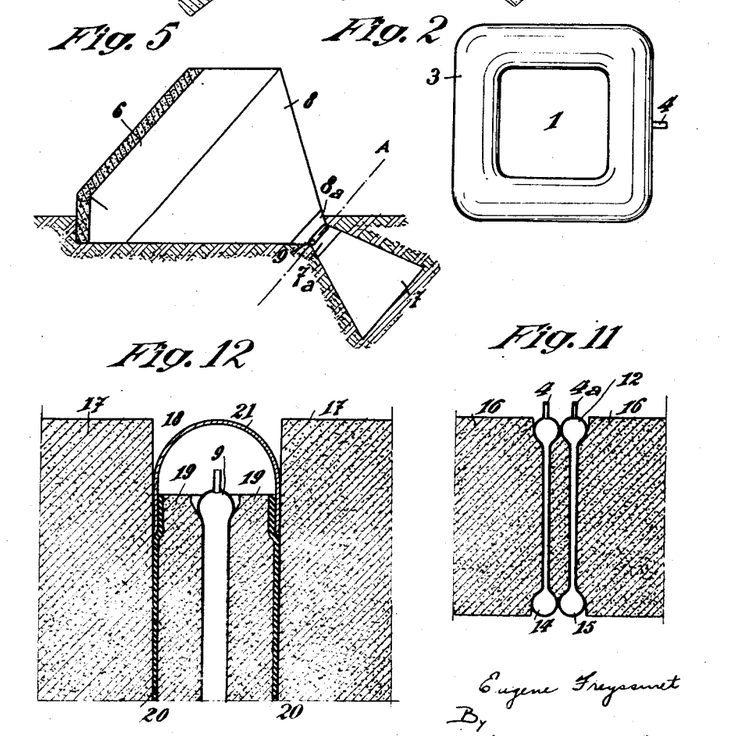
Fig. 2 is a plan view, on a smaller scale, of the apparatus of Fig. 1.
Fig. 5 illustrates a method of application of an apparatus according to the invention.
Fig. 11 shows the arrangement of two superposed apparatus according to the invention.
Fig. 12 shows a fluidtight packing made by means of the apparatus according to the invention, between two parts of a construction.
Figure 3:
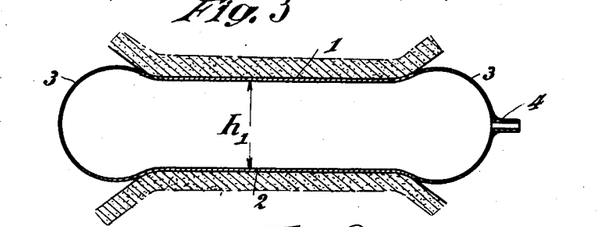
Fig. 3 is a sectional view analogous to Fig. 1, showing the apparatus after the pressure has been applied.

In the embodiment shown by Figs. 1 to 3, the apparatus includes two parallel plates 1 and 2, for instance of highly malleable steel sheet or any other metal of the same quality. These plates are connected along their edges by tore-shaped or cylindrical elements 3, fluidtightness being obtained in a perfect manner by interconnecting the plates and the tore-shaped or cylindrical surfaces by electric welding or any other equivalent means.

A tube 4 welded on the peripheral element 3 or at any other suitable place permits of injecting a liquid under pressure which moves plates 1 and 2 away from each other, while modifying by plastic deformation the shape of the tore-shaped or cylindrical elements the radius of which increases.

The presence of this peripheral element which deforms under the effect of the pressure that is transmitted enables plates 1 and 2 of being displaced without being deformed, and Fig. 3 approximately shows the shape of the inflated device. Before taking this shape, the apparatus passes through a series of intermediate shapes. The active stroke of the apparatus is equal to the variation $h_1-h$ of the distance between the two plates.

Figure 4:
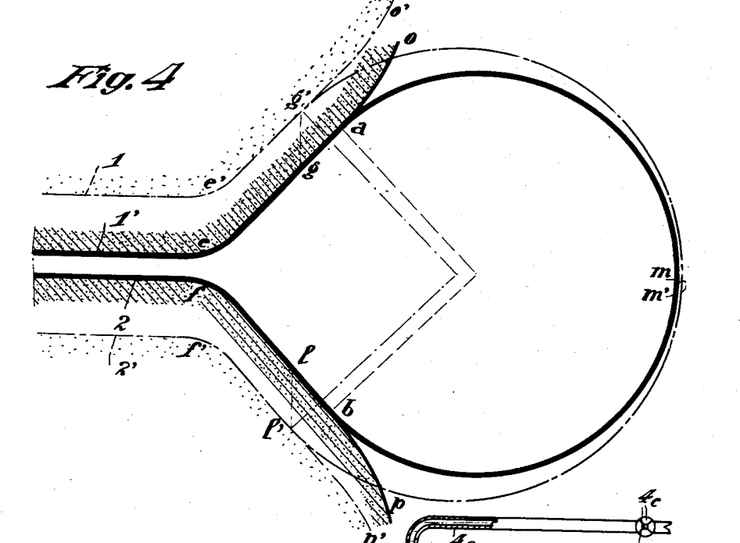
Fig. 4 is a diagrammatic partial view, in section, on a larger scale, of the annular element provided along the periphery of the apparatus.

As shown by Fig. 4, the section of the peripheral element 3 of the apparatus includes a circular arc $amb$ and two curves $ae$ and $bf$ tangent to this arc at $a$ and $b$ respectively and joined to plates 1 and 2. The masses $o$ and $p$ to be compressed have surfaces which correspond to the shape of plates 1 and 2, in such manner that the surface along which the apparatus according to the invention bears on the masses is limited on either face of the apparatus by the curve which is the geometric locus of points $a$ and $b$ on the respective faces. If the masses in question are not shaped to correspond to the shape of these bearing surfaces, the apparatus according to the invention may be embedded in concrete before they are fitted in position, the embedding concrete being limited by surfaces corresponding to those of the above mentioned masses, in particular flat surfaces as it will be hereinafter explained.

When plates 1 and 2 are moved away from each other, the radius and length of arc $amb$ increases, at the expense of elements $ae$ and $bf$, which are first applied against the masses $o$ and $p$ and which are detached from said masses so as to assume a circular shape over lengths $ag$ and $bl$. Thus arc $amb$ becomes arc $g'm'l'$, the masses $o$ and $p$ being moved away from each other with a translatory motion, so as to come at $o'$ and $p'$. By varying the shape and inclination of elements $ae$ and $bf$ it is possible to modify displacement $mm'$, either by displacing $m'$ toward the outside with respect to $m$ or by moving it toward the inside, or again by rendering this displacement equal to zero, in which case $m'$ coincides with $m$, the displacement, if any, complying with a given law, which can be chosen. For instance, by making $ae$ and $bf$ of rectilinear shape and inclining them at an angle of about 45° with respect to the plates, point $m$ is not substantially displaced.

Experience teaches that, with mild steel sheets of a thickness of 2 millimeters, the pressure in the apparatus can be made as high as several hundreds of kilograms per square centimeter. As the apparatus can be made with metal sheets of a size as great as it may be desired, that is to say with a bearing surface as wide as it may be desired, I can exert, at low cost and without any complicated mechanical device, enormous efforts, as high as several millions of tons.

Another advantage of the apparatus according to the invention is that its bearing surfaces can be arranged in such maner that they do not remain parallel; they can even be of a shape other than plane. As a matter of fact, it will be readily understood that it would be possible to replace plates 1 and 2 of the example above described by sheets having any desired shape in section. Therefore, it is possible to produce complex efforts which have not a single resultant.

In order to obtain a stroke as great as it may be necessary, I can superpose several apparatus of the type above described, acting simultaneously, these apparatus being separated from one another by elements of suitable shape, so as to obtain their proper bearing on plates 1 and 2 and elements $a\ e\ b\ f$ of the peripheral parts 3 above mentioned.

Fig. 5 shows the application of the apparatus according to the invention, as above described, to a multiple arch dam 6, diagrammatically shown in transverse section.

For instance, it is desired, in order to raise the level of the dam, to establish at 7 a supplementary support for prop 8 which has become insufficient. If one waits until the elastic deformations of the dam and of part 8, at the time of the lifting of the whole, produce an effective bearing in plane A—A, there may occur, as a consequence displacements of the mass which will disintegrate it and destroy the liquid-tightness of the dam. The supplementary resistance created at 7 will come into play only after the occurring of the disorders it was intended to avoid. Everything will take place in a very different manner if there is artificially created, before the operation, or gradually in the course of this operation, an active effort on element 8 equal to the reaction which it has been deemed useful to rely upon from part 7. The deformation of the whole can thus be reduced to a value compatible with the possibilities of plastic deformations of the formations.

In order to produce the desired effort in plane A—A, it is necessary to have apparatus, adapted to act as jacks, which are of very high power with a volume as reduced as possible. The apparatus according to the invention as above described are particularly well adapted to this use and they do not involve considerable expenses.

Several of these apparatus may be placed side by side and they will act simultaneously for obtaining the desired efforts.

In the case of apparatus of this kind which are kept under pressure in such manner as to transmit permanent efforts to masonry works, arrangements must be taken for permitting of withdrawing and replacing the aparatus which would prove defective for lack of fluidtightness.

It is possible, for this purpose, to insert, between the apparatus and the parts against which they bear, wedge-shaped packing elements. An arrangement of this kind is shown by Figs. 6 to 8.

On either side of the plane A—A in which the prop or buttress 8 and the supplementary foundation 7 are to bear against each other, I provide masses or blocks 7a, 8a of concrete which is rich and sufficiently reinforced for being able to support the efforts to be transmitted, which are particularly important in the vicinity of the plane A—A in which the apparatus according to the invention will be disposed. These blocks are disposed in adjoining relation respectively to foundation 7 and buttress 8. They bear against each other, through a series of dry joints 7b which form in plane A—A a kind of castellated structure (Fig. 7). The recesses 7c in this structure serve to house the apparatus according to the invention (on the left hand side of Fig. 7, I have shown two of these recesses which are not yet provided with the apparatus according to the invention).

Figure 8:
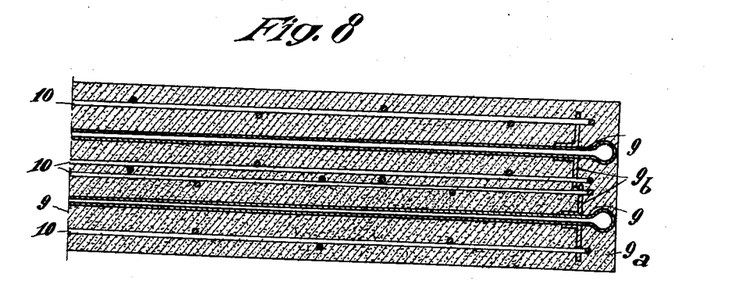
Fig. 8 is a section, on an enlarged scale, of a removable block formed by apparatus according to the invention, embedded in concrete.

These apparatus are brought into play, in a particularly advantageous manner, in the form of a block embedded in concrete, including for instance, as shown by Fig. 8, two superposed jack apparatus 9, embedded in concrete 9a. Before the pouring of this concrete 9a, the peripheral portion of the jack apparatus is fitted with welded lugs or projections 9b so as to ensure their anchoring in the concrete, the latter being strongly reinforced above and below the jack apparatus and also between them, for instance by means of a system of bars 10 at right angles to one another.

Figure 6:
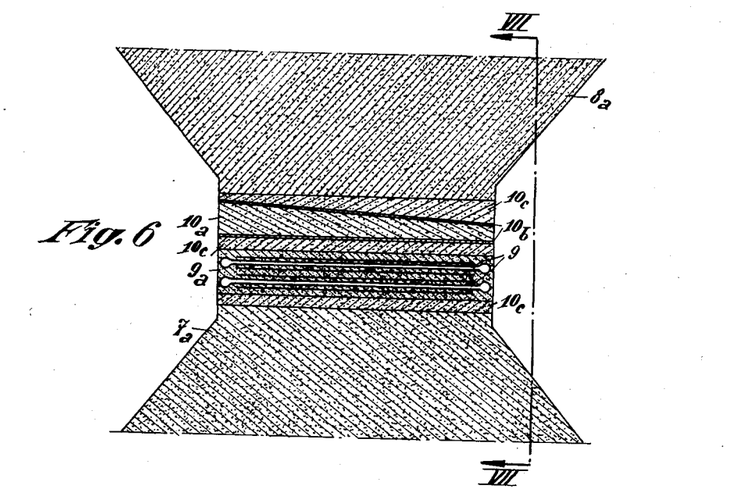
Fig. 6 is a detail view on an enlarged scale of a portion of Fig. 5, in section by a plane parallel to the plane of Fig. 5.
Figure 7:
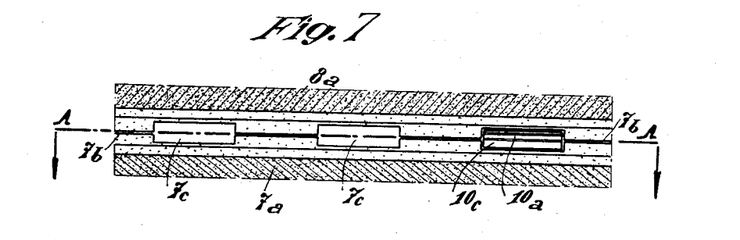
Fig. 7 is a section on the line VII—VII of Fig. 6.

In a given recess 7c, I dispose, as shown by Fig. 6, a system including a plurality of jack apparatus and a mass of concrete made as above explained, and a wedge 10a, which can be constituted, for instance, by a piece of reinforced concrete covered by two metal sheet plates 10b.

The intervals 10c between block 7a and the system constituted by the jack apparatus, the concrete mass and the wedge, and between this system and block 8a are filled with jagged concrete.

When the jack apparatus are subjected to the action of pressure, they are inflated and transmit their effort to buttress 7 and to foundation 8 through the concrete which embeds them and the various intermediate elements, especially wedges 10a. The dry joints 7b are opened a distance equal to the stroke or displacement of the jack apparatus.

If lack of fluid tightness occurs in one of the jack apparatus units, the corresponding wedge 10a is driven out or it is destroyed by reducing into powder the concrete of which it is made. It is thus possible to remove the jack apparatus unit, which is replaced by a new unit.

It is particularly advisable to have recourse to the following method in order to ensure the maintaining of the pressure independently of the fluid-tightness of the jack apparatus:

The jack apparatus are inflated with a matter which is first perfectly fluid in order fully to transmit the pressures and to ensure the correct working of the jack apparatus, this matter being capable of solidifying subsequently and of resisting all causes of destruction, even in the case of disappearance of the bags of the jack apparatus by corrosion.

As matter of this kind, I may cite cements or matters which are solid at ordinary temperature but have a relatively low boiling point. It is then necessary to provide an internal or external, electric or steam system for heating the jacks in advance.

I have found that it is advantageous to make use of synthetic resins which, under the effect of a relatively small variation of temperature or through the mere action of time at constant temperature, pass from the liquid state to the solid state in which they are very strong from a mechanical point of view. The application of a formaldehyde-phenol synthetic resin hardening at low temperature or even in the cold state, such as the resin sold on the market under the name of "brauthite" has proved to be particularly advantageous. It will be injected into the jack apparatus in the liquid state at the desired pressure and it will be allowed subsequently to set automatically, or this setting will be facilitated by a heating of the jack apparatus, according to the adjustment of the composition of the initial liquid.

It may be necessary to vary, in the course of time, the efforts created by the jack apparatus in the mass of masonry in which they are incorporated or again to modify the expansion of the jacks so as to keep the effort they produce to a constant value, despite the slow modifications of the elastic conditions of their bearing points. This will be, in particular, the case when, the structure being constituted by concrete, either reinforced or not, it is desired to obtain constant compression stresses in the concrete mass despite its shrinkage and its slow deformation under load.

If the jack apparatus are filled with a body which remains constantly liquid, it will suffice to connect these jack apparatus through pipes with hydraulic pumps or accumulators through which their pressure can be controlled.

When the jack apparatus are first filled with a body which is first liquid then solidified, but fusible at a temperature which can be obtained in practice, I may proceed to a melting and inject into the jack apparatus a new amount of molten matter or, on the contrary, withdraw from these jack apparatus a portion of the matter they contain.

This solution involves a danger if the jack apparatus have lost their fluidtightness, because the elastic situation created by them can then be destroyed as a whole, as soon as the filling matter of the jack apparatus comes back into the solid state. This danger can be avoided by the combined use of a solidifiable matter and a matter which remains liquid or can very easily be liquefied.

I inject into the upper part of the jack apparatus, immediately after the injection of the solidifiable matter, such as the synthetic resin, a small amount of a liquid which does not mix with this resin, for instance ordinary mineral oil. This liquid comes to occupy the portions of the jack close to the inlet conduit and permits the injection of new amounts of resin for periodically re-establishing the pressure in the jack apparatus.

It will be advantageous to make use for this purpose of a jack with two conduits connected with each other through the zone in which the oil is localized, in such manner as to permit the evacuation of the latter at low pressure before the injection of the supplementary amount of resin.

Figures 9, 10:
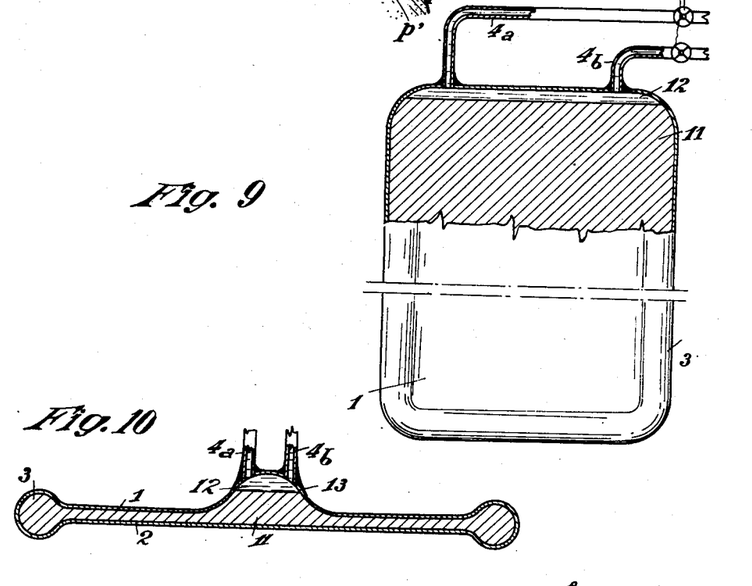
Fig. 9 is an elevational view, partly in section, of an apparatus provided with two conduits.
Fig. 10 is a horizontal section of another embodiment of an apparatus according to the invention provided with two conduits.

Fig. 9 shows a jack apparatus of this kind which is supposed to act in the vertical direction. This jack is first filled with resin 11, injected in the liquid state at the desired pressure and, after this injection, I introduce, through tubes 4a and 4b, connected to the upper part of the jack apparatus and fitted with valves 4c, an amount of mineral oil sufficient in order that this oil, pushing the resin not yet solidified ahead of it, fills a small volume 12 in communication with the two tubes.

When, after solidification of the resin, it is desired to increase the expansion of the jack apparatus, resin is injected in the liquid state through one of the tubes 4a, the other tube 4b being used for the discharge of the oil contained in 12 which is driven out by the resin that is injected.

When the whole of the volume 12 is filled with resin, tube 4b is closed and, through tube 4a, I keep injecting liquid resin under the desired pressure for causing it to tear the walls of the jack apparatus from the matter already hardened at 11 and forming, between these walls and this matter, a film of the desired thickness, which will harden subsequently. But, prior to this hardening, I will proceed to a new injection of oil under pressure through tubes 4a and 4b so as again to form the upper volume of oil 12 which will permit further injections of resin in case of need.

I have found that it is advantageous to part the matter already hardened from the walls of the jack apparatus, not directly through the liquid resin but by means of an injection of oil under pressure, performed before the introduction of the liquid resin. This parting is relatively easy in the case of "brauthite" because it does not adhere to sheet iron.

After this result has been obtained through the action of oil under pressure, which will also permit of checking fluidtightness, the pressure is allowed to drop and the oil is driven out by the liquid resin, as above explained.

When the jack apparatus are used in the horizontal direction, I may provide, at their center, a kind of bell-shaped part 13 (see Fig. 10), which will be connected to tubes 4a and 4b and will serve to receive the small volume of oil 12.

One of the tubes can be replaced by a fine tube passing through the inside of the other.

One of the tubes may drop down to a certain level so as to establish a low level of the oil, which is a protection against the danger of total filling by resin.

A particularly interesting arrangement consists in superposing two jack apparatus 14, 15 (Fig. 11) between the masses 16 to be compressed, one of which jack apparatus, 14 for instance, will be inflated with oil, while the other, 15, is inflated with a solidifiable matter such as resin. The pressure of jack 14 having been allowed to drop to zero, jack 15 alone will first be brought into play and, after injection of the resin a small amount of oil will be sent into the conduit of this jack apparatus 15, as above explained. Then, jack apparatus 14 will be connected with a constant pressure hydraulic accumulator. As blocks 16 are being moved, the expansion of the jack apparatus increases, while keeping the effort at a constant value. When the expansion of apparatus 14 reaches a value such that a leak which would destroy the pressure in this apparatus might be dangerous, liquid resin is fed into jack apparatus 15 under a pressure slightly higher than that existing in jack apparatus 14, with the eventual use of a double conduit, as above explained. This resin will come to form a film at the surface of the resin already hardened, then it will itself harden. The injection of resin into apparatus 15 is followed by an injection of oil. The expansion of jack apparatus 14 has thus been brought back to zero. In the course of a subsequent movement of the blocks it will increase; a further amount of resin will then be injected into jack apparatus 15, and so on.

The two jack apparatus might be disposed inside a block of concrete poured around them, as above described with reference to Fig. 8. This arrangement can, of course, be utilized for one or several jacks.

As a matter of fact, the jack apparatus according to the invention are adapted to a great number of applications. As above explained, they permit of maintaining permanent compression stresses in reinforced concrete constructions or parts of constructions in such manner as to oppose the formation in this material of detrimental tractive stresses, and this is a very important application of the jack apparatus according to the invention. From this point of view, they can be utilized independently of the preliminary tensioning of the concrete reinforcements or in combination with this tensioning for the production of which they can be utilized.

The apparatus according to the invention also permit of creating horizontal efforts between the joints of structures, for instance between the joints of big dams for neutralizing the stresses resulting from sliding of the ground along the side of a hill.

I may take advantage of the fitting in position of the jack apparatus in these joints for ensuring fluidtightness thereof.

Fig. 12 shows an arrangement which can be utilized for this purpose. I have shown, in this figure, in horizontal section, two blocks 17 of a dam, separated from each other by a joint 18. In this joint or packing device, I place a series of jack apparatus 9 according to the invention. These jack apparatus transmit their pressure to blocks 17 through wedges 19 and cushions 20 of a plastic material such as rubber, bitumen and asbestos, etc. A metal sheet 21, bent and held between wedges 19 and blocks 17, ensures fluidtightness.

Figure 13:
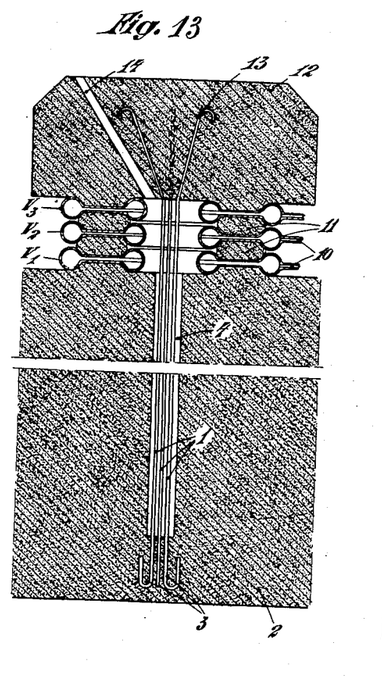
Fig. 13 is a sectional view of a device for tensioning rectilinear reinforcements.
Figures 14, 15:
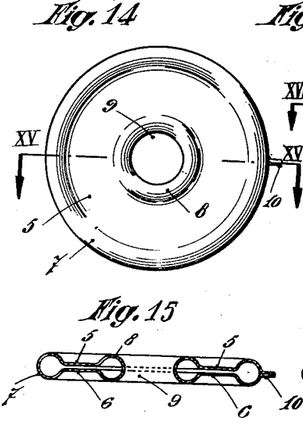
Fig. 14 is a plan view of an apparatus according to the invention incorporated in a system.
Fig. 15 is a sectional view on the line XV—XV of Fig. 14.

In Fig. 13, the jack apparatus is applied to the tensioning of a group of rectilinear reinforcements 101 of a concrete or masonry block 102. Reinforcements are anchored at one of their ends 103 in the block and, over the remainder of their length they are free in a cylindrical chamber 104 provided in the course of the construction of the block. The jack apparatus that is utilized includes, as shown by Figs. 14 and 15, two flat rings 105 and 106 of a malleable metal the edges of which are connected two by two through tore-shaped peripheral elements 107 and 108. The annular jack apparatus thus formed has, at its central part, an aperture 109 through which the reinforcements to be tensioned can be passed, and it is fitted, on one of the peripheral tore-shaped elements, with an inlet conduit 110 for the introduction of the liquid matter under pressure.

In Fig. 13, I have shown three of these jack apparatus $v_1, v_2, v_3$, superposed with the interposition of wedges 111 which can be made of concrete or any other suitable material. After the fitting in position of these jack apparatus, the mass of concrete 112 in which the upper ends 113 of the reinforcements to be tensioned are anchored is poured above the upper jack apparatus. When the concrete of mass 112 has set and hardened, I simultaneously expand all of the jack apparatus, which move mass 112 away from block 102, thus tensioning the reinforcements. The number of jacks to be employed varies of course according to the expansion of these jacks and according to the value of the elastic elongation which is to be undergone by the reinforcements.

The tension of the reinforcements can be maintained by the solidification of the matter injected into the jack apparatus and, if necessary, as soon as the jack apparatus have acted, it is possible to pour concrete between block 102 and the anchoring head 112. I may provide in this head channels such as 114, which will serve to fill the chamber 104 of the reinforcements and the central opening of the jacks with concrete.

If it is desired subsequently to eliminate the tensioning of the reinforcements, it suffices to destroy one or several of the intermediate wedges 111 which are made sufficiently thick for permitting to reach them between the jacks.

Figure 16:
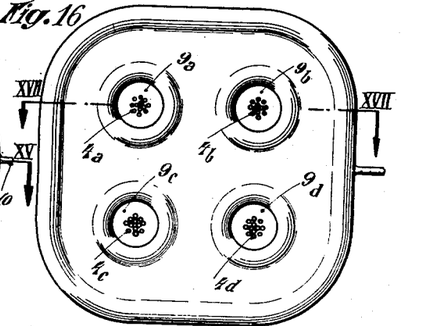
Fig. 16 shows, in plan view, a modification of the apparatus, permitting of simultaneously tensioning several reinforcements.
Figure 17:
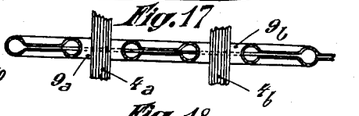
Fig. 17 is a sectional view on the line XVII—XVII of Fig. 16.

The jack apparatus may be designed in such manner as to permit the simultaneous tensioning of several groups of reinforcements. Thus, it is seen, in Figs. 16 and 17, that a jack may be provided with four holes 109a, 109b, 109c, 109d through which four groups of reinforcements to be tensioned 104a, 104b, 104c, 104d can be passed.

The tensions imparted to the reinforcements may be equal or unequal according to the arrangement of the cables, which is determined as a function of the desired distribution of the tensions, account being taken of the fact that the center of gravity of the reactions exerted by the cables on a jack coincides with the center of gravity of the surface of action of the jack.

The jack apparatus according to the invention afford a solution of the difficult problem of tensioning the reinforcements of blocks of circular section. As a matter of fact, it is possible to dispose a series of such jack apparatus between the block to be compressed and the circular reinforcements to be tensioned. However, it is more advantageous to make the jack in the form of a flattened tube, which can easily be housed between the block and the reinforcement. For instance, in the embodiment of Fig. 18, I have shown in section a block of concrete 115 in the form of an annulus of revolution having its axis at A—A. Each of the circular reinforcements of this block to be tensioned is constituted by a plurality of spires 116 of a metallic cable, wound on one another, preferably on the inside of a ring 117 of U-shaped section which can also form a part of the reinforcement. Between this ring 117 and the block, there is interposed an annular jack apparatus according to the invention. This apparatus can be made, for instance, by assembling along their edges, through tore-shaped elements 118, 119, two cylindrical annular parts, concentric and coaxial 120, 121. Intermediate wedges 122, 123 of reinforced concrete or any other matter are provided on either side of the jack apparatus.

Figure 18:
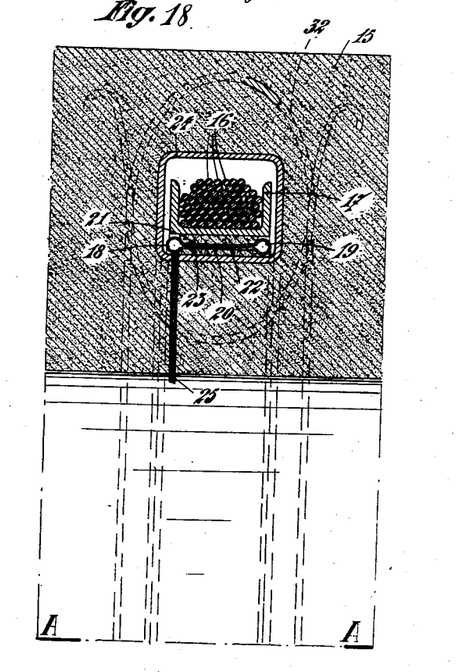
Fig. 18 is an axial section of a device for tensioning circular reinforcements.

When the reinforcements to be tensioned are to be embedded on the inside of the block to be compressed and placed under tension after pouring of the whole of the block, I arrange the whole of the jack and the reinforcements inside a sleeve or casing 124 leaving the space necessary for the increase of diameter of the reinforcement when the jack is inflated. This jack is fitted with an inflating conduit 125 which can be reached both from the outside and the inside of the block or only from the inside or the outside.

The jack apparatus may consist of a complete ring or it may be formed of a plurality of elementary jacks each in the form of an annular segment and which are placed end to end. This last mentioned arrangement is advantageous from the point of view of safety and protection against leakage of the liquid matter, when the jack apparatus is inflated. If, in this case, one of the jack apparatus happened to leak, the others keep working and the only consequence of the leakage is an increase of the expansion of the elements adjoining the defective element.

Figures 19, 20:
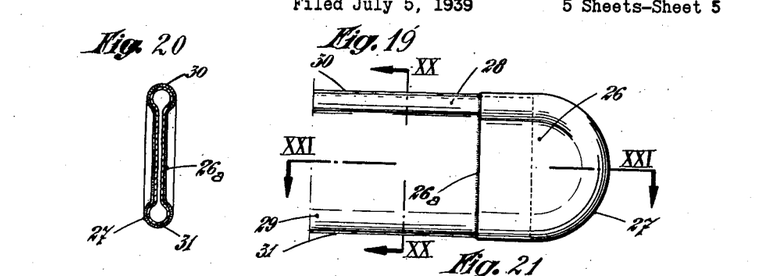
Fig. 19 shows the end of a ring segment which constitutes one of the apparatus included in the device of Fig. 18.
Figs. 20 and 21 are sections by planes passing through lines XX—XX and XXI—XXI of Fig. 19.

The flattened tube which forms each of the segments and the transverse section of which is visible on Fig. 20 can be closed at its ends by covering it with a kind of flat cap 126 provided with a horse-shoe-shaped peripheral element 127 which connects the edge elements 128, 129 of the flat tube. The cap and the tube are assembled together in a fluidtight manner, for instance by welding at 126a.

Figures 21, 22:
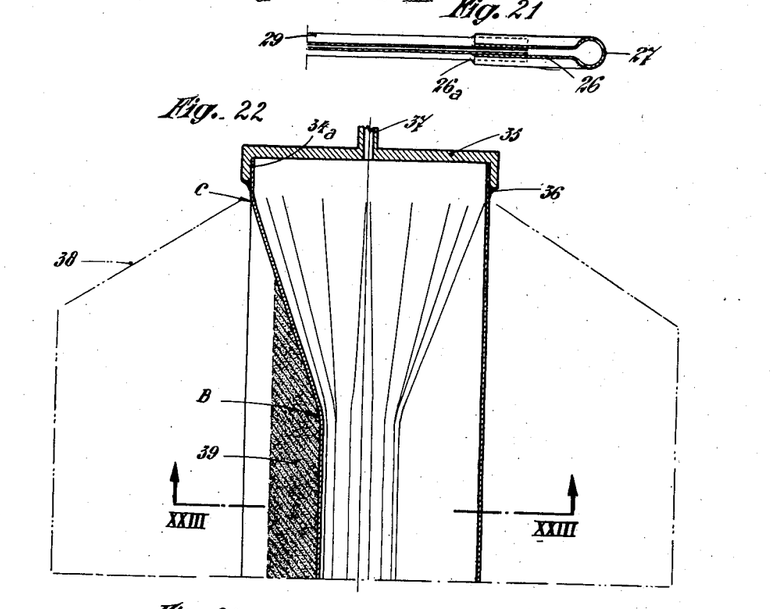
Fig. 22 shows, in vertical section, a modification which constitutes a kind of inflatable post.

The tube can be made of a single piece without any welding by drawing a malleable metal such as copper, steel or the like, or it can also be made of two parts welded together on the edges at 130, 131, as in the case of Figs. 19 to 21. The same is true of caps 126 which can be made of a single piece by stamping or can be made of two parts welded together along their edges.

The use of weldless tubes, tested before they are fitted in position, eliminates or reduces the risks of bad working of an element at the time of inflating.

Of course, it is possible to make use of several superposed annular jack elements or several superposed ring segments, which permits of increasing the expansion of the jack apparatus and also the safety.

This arrangement is also well adapted to the tensioning of helical reinforcements or even of reinforcements having the shape of any desired curve, the tension obtained at each point being inversely proportional to the radius of curvature at this point.

The jack apparatus permits of obtaining the tensioning of circular reinforcements, not only on the outside of a block but also on the inside, which is a very considerable advantage. This last mentioned case is that considered by Fig. 18. In the case in which the block is hollow and the circular rings to be tensioned are near the inner surface of the block, it is advisable to connect them with the remainder of said block through suitable reinforcements, for instance helical reinforcements wound around the circular reinforcements.

In order to limit the risks of leakage, I may mix with the liquid matters used for inflating the jack apparatus substances such as wood flour, kieselguhr, or others capable of filling a crack.

I have also found that re-inflating of the jack apparatus in the course of its use can be obtained by making a hole through the feed conduit into the hardened matter and injecting through this hole a new amount of liquid matter under a high pressure which can be of several hundreds of kilograms per square centimeter. This matter, under high pressure, forms a path through the hardened matter by causing it to burst, and the jack apparatus is thus reinflated.

When it is not possible to drive a hole through the conduit which has been used for initially inflating the jack device, it suffices to provide a hole at an accessible point of the jack apparatus and to drive thereinto a conical needle, provided, in the direction of its axis, with a passage through which the liquid matter is injected under high pressure.

Besides, when leakage occurs in a jack apparatus, at an accessible point thereof, it is possible to repair on the spot by electric or blowpipe welding by taking the precaution of driving a hole in the wall of the device close to the point to be repaired, for the escape of the gases or vapours given off by the filling matter, this hole being subsequently closed by a conical spindle driven with a hammer.

A leak can also be stopped by matting of the metal or tightly applying thereon a piece of suitable shape, with the interposition of a plastic joint.

The jack apparatus according to the invention can be employed for compressing not only solid blocks but also liquid, pasty, or powdery masses, such as concretes, earth formations and the like. By providing the jack apparatus on the inside of these masses, I obtain their setting in compression directly, without requiring elements for the transmission of pressure. The external deformation of said masses can be limited or prevented, either by means of solid blocks or by means of envelopes, or by a combination of these two means, the compression of said solid blocks or the setting in tension of the envelopes of the compressed materials being in this case obtained in addition.

In particular, the jack apparatus according to the invention can be applied with a great facility for modifying the state of equilibrium of earth formations, sands, muds or clays. They can thus be given the form of elongated plates which will be lowered into the ground by beating, either between two plates of suitable shape, or by giving them a suitable resistance to beating, or by injection of water, or in any other way.

This method will permit of opposing, in some cases, the settling of ground formations under the effect of certain weights such for instance as those of buildings, of compensating for settling in some constructions, such as ground dams, and so on, of compressing the ground formations under masonry structures, of ensuring the fluidtightness of a ground formation, of restoring the equilibrium of a construction, or bringing it back to a desired level.

In these applications, it would be too expensive to fill the jack apparatus with synthetic resin. The apparatus can be filled either with concrete, in particular fused cement injected by means of a pump, or with sand, easy to introduce by driving it by means of water under pressure, according to known methods.

The same jack apparatus can be applied with advantage instead of explosives, when operating on great masses of rocks with a view to removing them or cutting them into portions. The jack apparatus will then be introduced into holes or grooves provided in the rock to be cut into elements, and they are fixed with respect to the rock walls by means of hydraulically settled fine sand or cement. They permit of developing pressures as high as 1000 atmospheres and even more, capable of producing the breaking and the displacement of rocky blocks of very big size, without shocks capable of altering the masses to be cut into parts or of producing disturbances in the vicinity.

In these various applications, it may be advisable to cause the jacks to act on the inside of a bore hole of very small size, and it is advantageous that the jacks, when expanded, may have a volume as great as possible.

Figure 23:
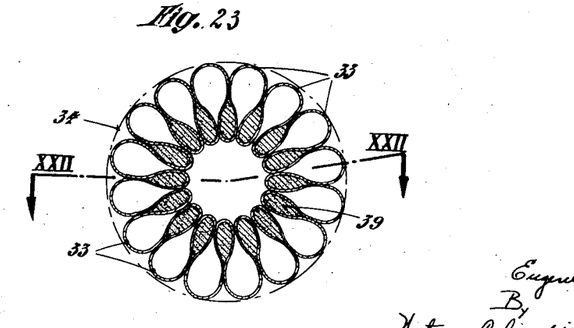
Fig. 23 is a sectional view on the line XXIII—XXIII of Fig. 22. On this figure XXII—XXII designates the trace of the plane of Fig. 22.

A jack apparatus according to the invention which complies with this condition is illustrated by Figs. 22 and 23. Its wall is provided, after it has been inflated, with a great number of folds or the like 133 which are inscribed inside a cylinder 134 of a diameter corresponding to the application that is being considered, for instance the introduction of the jack apparatus into a cylindrical bore-hole. It will be readily understood that, in the course of the gradual inflating of such a jack, these folds or projections disappear and the section becomes that of a circle of large diameter. Near the ends of the jack apparatus, the folds diminish gradually until they form a perfectly cylindrical wall 134a, as shown by the inclined line B C, in Fig. 22. Each of the cylindrical ends 134a can be closed by means of a cover 135 welded at 136. One of these covers can be provided with a feed tube 137 for the introduction of the inflating matter into the jack apparatus.

In Fig. 22, the dotted lines 138 diagrammatically illustrate the form of the deformable wall, after it has been inflated.

In Fig. 23, I have also shown at 139 a filling of reinforced concrete or another matter in the folds of the wall which communicate with the outside. This filling, which can be replaced by metallic bars for instance, is intended to stiffen the apparatus after it has been inflated, whereby it can be driven into the ground.

The inflating can be obtained by means of water and, after it has been inflated, the jack apparatus can be filled with gravel or concrete introduced, for instance, under pressure by means of an intermediate pressure chamber.

The circonvolutions of the wall can be obtained by bending the metal sheets in a machine and subsequently assembling them by welding, for instance along the outer ridges of the circonvolutions.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A jack apparatus which comprises, in combination, a malleable metal bag including two plates constituting the bearing faces of the jack and deformable means forming a fluidtight joint between said plates, and at least one feed conduit opening into said bag so as to permit of inflating it.

2. A jack apparatus which comprises, in combination, a malleable metal bag including two plates constituting the bearing faces of the jack and at least one deformable tore-shaped element interconnecting the corresponding edges of said plates in a fluidtight manner, and at least one feed conduit opening into said bag so as to permit of inflating it.

3. A jack apparatus which comprises, in combination, a malleable metal bag including two plates constituting the bearing faces of the jack and at least one deformable tore-shaped element interconnecting the corresponding edges of said plates in a fluidtight manner, and at least one feed conduit carried by said tore-shaped element and opening into said bag so as to permit of inflating it.

4. A jack apparatus which comprises, in combination, a malleable metal bag including two plates constituting the bearing faces of the jack and provided with at least one hole formed in each of them, in registering position for these two plates, for the passage of elements to be tensioned, deformable joints interconnecting in a fluidtight manner the corresponding edges of said plates, and at least one feed conduit opening into said bag so as to permit of inflating it.

5. A jack apparatus which comprises, in combination, a malleable metal bag including two plates constituting the bearing faces of the jack and deformable means forming a fluidtight joint between said plates, and two feed conduits opening into said bag close to each other, so as to permit of inflating said bag with a matter which is initially fluid and hardens subsequently when introduced into said bag, and of introducing and withdrawing, at will, a small amount of a matter which remains fluid, around the openings of said two feed conduits into said bag.

6. A jack apparatus which comprises, in combination, a malleable metal bag including two horizontal plates constituting the bearing faces of the jack, one of said faces forming a bell-like chamber in its central face, and two feed conduits opening into said chamber, so as to permit of inflating said bag with a matter which is initially fluid and hardens after its introduction into said bag, and of introducing and withdrawing, at will, a small amount of a matter which remains fluid, in said chamber.

7. A jack apparatus which comprises, in combination, two malleable metal bags including each two substantially parallel plates and deformable means forming a fluidtight joint between said two plates, said plates being arranged in parallel relation and interconnected so as to transmit thrusts from one to the other, means for feeding a fluid capable of remaining permanently in the fluid state to one of said bags, and means for feeding a matter in the fluid state and adapted to harden subsequently to the other of said bags.

8. A system adapted to form a joint between two structure elements, which comprises, in combination, at least one jack interposed between said elements and constituted by a malleable metal bag including two plates forming the bearing faces of the jack and deformable means forming a fluidtight joint between said plates, and at least one feed conduit for a liquid under pressure opening into said bag, so as to permit of inflating said bag, intermediate pieces on either side of said jack interposed between said plates and said structure elements, packing means made of a plastic material caught between each of said intermediate pieces and the corresponding structure element, and a rounded metal sheet having its edges caught between said intermediate elements and said structure elements, so as to cover the joint in a fluidtight manner.

9. A system for forcing two blocks away from each other, which comprises, in combination, at least one jack constituted by a malleable metal bag including two plates forming the bearing faces of the jack, deformable means forming a fluidtight joint between said plates and means for feeding a liquid under pressure into said bag, and at least one wedge-shaped piece associated with said jack so as to transmit the thrust thereof to one of said blocks, whereby, once the blocks have been fixed to a distance from each other, it is possible, by withdrawing said wedge-shaped piece, to remove said jack from between said blocks.

10. A system for forcing two blocks away from each other, which comprises, in combination, at least two jacks in series, constituted each by a malleable metal bag including two plates forming the bearing faces of the jack and deformable means forming a fluidtight joint between said plates, and means for feeding a liquid under pressure into said bags, said two bags being arranged with their plates in parallel relation, and concrete embedding said two jacks so as to interconnect them.

11. A jack apparatus which comprises, in combination, a malleable metal bag including two parallel cylindrical plates constituting the bearing faces of the jack and deformable means forming a fluidtight joint between said plates, and at least one conduit opening into said bag for feeding a liquid under pressure thereinto so as to permit of inflating it.

12. A jack apparatus which comprises, in combination, a malleable metal bag including two parallel cylindrical plates constituting the bearing faces of the jack, deformable tore-shaped elements forming fluidtight joints between the corresponding edges of said cylindrical plates, and at least one conduit opening into said bag for feeding a liquid under pressure thereinto so as to permit of inflating it.

13. A jack apparatus which comprises, in combination, a plurality of elementary malleable metal bags including each two parallel cylindrical plates constituting the bearing faces of the jack element, and deformable means forming a fluidtight joint between said plates, at least one conduit opening into each bag for feeding a liquid under pressure thereinto so as to permit of inflating it, said elementary bags being so dimensioned and arranged that the whole forms a complete annular jack system.

14. A jack apparatus according to claim 13 in which said deformable means consist of tore-shaped elements.

15. A jack apparatus which comprises, in combination, a malleable metal bag constituted by a flexible wall folded annularly in zig-zag fashion whereby the whole, when not inflated, is inscribed in a circular section of a diameter much smaller than the diameter of the unfolded structure, and means for feeding a liquid under pressure into said bag for causing it to expand.

16. A jack apparatus according to claim 15 further including hard elements inserted in the inner folds so as to stiffen the whole.

17. A jack apparatus according to claim 15 further including hard concrete bars filling the inner folds of said folded wall, so as to stiffen the whole.

18. A method of utilizing a jack apparatus including two parallel plates assembled in a fluidtight manner by deformable joint means, which comprises injecting into said structure a matter which is initially fluid but hardens after a time.

19. A method of utilizing a jack apparatus formed by a malleable metal bag including two parallel plates assembled in a fluidtight manner by deformable joint means, which comprises injecting into said bag a matter which is initially fluid but hardens after a time leaving a small free space in said bag, and completing the filling of said space by means of a liquid which remains permanently in the liquid state.

20. A method of utilizing a jack apparatus formed by two malleable metal bags each constituted by two parallel plates assembled in a fluidtight manner by deformable joint means, said bags being superposed with respect to each other, which comprises injecting a permanent liquid into one of said bags, until a predetermined pressure is reached therein, then injecting into the other bag a matter which is initially fluid but solidifies subsequently, so as to permit the first mentioned liquid to escape from the first bag, and so on.

EUGÈNE FREYSSINET.